US011494723B2

(12) United States Patent
Johnson

(10) Patent No.: US 11,494,723 B2
(45) Date of Patent: Nov. 8, 2022

(54) METHODOLOGY AND SYSTEM FOR OPTIMIZING COMMUNICATIONS IN DYNAMIC LIGHTWEIGHT PERSONALIZED ANALYTICS

(71) Applicant: Sandra K. Johnson, Cary, NC (US)

(72) Inventor: Sandra K. Johnson, Cary, NC (US)

( * ) Notice: Subject to any disclaimer, the term of this patent is extended or adjusted under 35 U.S.C. 154(b) by 0 days.

(21) Appl. No.: 17/137,677

(22) Filed: Dec. 30, 2020

(65) Prior Publication Data
US 2021/0201241 A1 Jul. 1, 2021

Related U.S. Application Data

(60) Provisional application No. 62/922,244, filed on Dec. 30, 2019.

(51) Int. Cl.
G06Q 10/06 (2012.01)
G06Q 40/00 (2012.01)
G06Q 50/00 (2012.01)

(52) U.S. Cl.
CPC ....... *G06Q 10/06393* (2013.01); *G06Q 40/12* (2013.12); *G06Q 50/01* (2013.01)

(58) Field of Classification Search
CPC ... G06Q 10/06393; G06Q 40/12; G06Q 50/01
See application file for complete search history.

(56) References Cited

U.S. PATENT DOCUMENTS

| 7,774,271 | B1 | 8/2010 | Edwards et al. |
| 9,443,268 | B1* | 9/2016 | Kapczynski ......... G06Q 20/227 |
| 10,062,109 | B1 | 8/2018 | Poursartip et al. |
| 10,176,522 | B1* | 1/2019 | Lockwood-Stein ... G06Q 40/06 |
| 10,453,086 | B1 | 10/2019 | Scott et al. |
| 10,552,902 | B1 | 2/2020 | Lockwood-Stein et al. |
| 10,692,140 | B1 | 6/2020 | Kim et al. |
| 10,796,363 | B1* | 10/2020 | Kim ...................... G06Q 20/20 |
| 10,872,362 | B1 | 12/2020 | Shearer et al. |
| 10,902,512 | B1 | 1/2021 | Fern et al. |
| 2008/0242274 | A1 | 10/2008 | Swanburg et al. |
| 2009/0228375 | A1 | 9/2009 | Ford et al. |

(Continued)

FOREIGN PATENT DOCUMENTS

CN 108289310 A * 7/2018

OTHER PUBLICATIONS

Figi "Methodology for interoperator and cross-border P2P money transfer" (2020) (https://figi.itu.int/wp-content/uploads/2021/04/Methodology-for-measurement-of-Quality-of-Service-Key-Performance-Indicators-for-inter-operator-and-crossborder-P2P-money-transfers-1.pdf) (Year: 2020).*

(Continued)

*Primary Examiner* — Sujay Koneru
(74) *Attorney, Agent, or Firm* — Hunton Andrews Kurth LLP

(57) ABSTRACT

An embodiment of the present invention is directed to a feedback-based system and methodology for dynamically selecting communication messages, social media data, support data, etc. (denoted data) in evaluating dynamic lightweight personalized analytics (DLPA). Disclosed embodiments include a process for optimizing the key performance indicators (KPIs) used in measuring success by dynamically selecting the type, size, etc. of data leveraged by DLPA. This facilitates a small memory footprint and optimal computation when making smart, customized suggestions to users.

20 Claims, 7 Drawing Sheets

(56) References Cited

U.S. PATENT DOCUMENTS

| | | | |
|---|---|---|---|
| 2012/0116957 A1* | 5/2012 | Zanzot | G06Q 40/00 705/39 |
| 2013/0054396 A1* | 2/2013 | Goldfinger | G07G 1/14 705/21 |
| 2013/0325679 A1 | 12/2013 | Yeri et al. | |
| 2013/0339234 A1 | 12/2013 | Prakash et al. | |
| 2014/0012648 A1 | 1/2014 | Grimes | |
| 2014/0081787 A1 | 3/2014 | Blackhurst et al. | |
| 2014/0164224 A1 | 6/2014 | Grigg et al. | |
| 2014/0207550 A1 | 7/2014 | Eden et al. | |
| 2014/0365354 A1 | 12/2014 | Shvarts | |
| 2015/0073952 A1* | 3/2015 | Ventura | G06Q 40/12 705/30 |
| 2015/0379488 A1 | 12/2015 | Ruff et al. | |
| 2016/0260069 A1* | 9/2016 | Holman | G06Q 30/06 |
| 2017/0161289 A1 | 6/2017 | Ignatowicz et al. | |
| 2018/0096337 A1 | 4/2018 | Ascencio Rios et al. | |
| 2018/0096344 A1 | 4/2018 | Ascencio Rios et al. | |
| 2018/0114216 A1* | 4/2018 | Joseph | G06Q 20/40145 |
| 2018/0268487 A1* | 9/2018 | Matthews | G06Q 40/06 |
| 2019/0213660 A1 | 7/2019 | Astrada et al. | |
| 2019/0303889 A1* | 10/2019 | Cho | H04L 65/403 |
| 2020/0034805 A1* | 1/2020 | Lee | G06Q 20/381 |
| 2020/0097955 A1* | 3/2020 | Gandhi | G06Q 30/06 |
| 2020/0219025 A1 | 7/2020 | Conte et al. | |
| 2020/0412817 A1 | 12/2020 | Ranjan et al. | |

OTHER PUBLICATIONS

U.S. Appl. No. 17/084,778, filed Oct. 2020, Johnson.
U.S. Appl. No. 17/013,895, filed Sep. 2020, Johnson.
U.S. Appl. No. 16/914,629, filed Jun. 2020, Johnson.

* cited by examiner

METHODOLOGY AND SYSTEM FOR OPTIMIZING COMMUNICATIONS IN DYNAMIC LIGHTWEIGHT PERSONALIZED ANALYTICS

CROSS REFERENCE TO RELATED APPLICATIONS

This application claims priority to U.S. Provisional Application 62/922,244, filed Dec. 30, 2019, the contents of which are incorporated herein in their entirety.

This application relates to U.S. application Ser. No. 17/084,778, filed Oct. 30, 2020, which claims priority to U.S. Provisional Application 62/927,872, filed Oct. 30, 2019, and U.S. application Ser. No. 17/013,895, filed Sep. 8, 2020, which claims priority to U.S. Provisional Application 62/897,360, filed Sep. 8, 2019, and U.S. application Ser. No. 16/914,629, filed Jun. 29, 2020, which claims priority to U.S. Provisional Application 62/868,950, filed Jun. 30, 2019, the contents of which are incorporated herein in their entirety.

FIELD OF THE INVENTION

The disclosed teachings relate generally to dynamically selecting consumer communications, social media, support and other data to optimize results for fast, behavioral analytics. In addition, it focuses on leveraging a small footprint to gain personalized insights. Potential participants include not only those in consumer-focused industries and entities, and analytics, but any entity that benefits from suggestions for optimizing relatively small amounts of data using fast computational times.

BACKGROUND

Many consumer-based companies leverage customer data and associated predictive, prescriptive, and other analytic methodologies to gain insights. Such information can translate into suggestions to improve efficiencies, understand trends, create new potential markets, or discover or prevent fraud, to name a few. There is an abundance of analytics efforts conducted to gain such insights. With an increasingly consumer-centric society, there is a growing focus on behavioral analytics to understand customer preferences that can translate into market gains. Much of this work leverages a plethora of structured and unstructured data that may be siloed and geographically dispersed for insights.

There are many consumer-focused and other industries that require or benefit from small, lightweight, and fast analytics. For example, the prevailing focus in the remittance industry is the transfer of funds from sender to receiver. The transfer amounts are small, and users require minimal transfer times. Moreover, with thin industry profit margins it is important that all efforts to assist in transferring funds are efficient, lightweight, and fast. In this and many other industries, there are no significant efforts to build customer relationships, understand their wants, needs and behaviors, and build customer loyalty. However, a study has shown that businesses that develop strong customer connections outperform their competitors by 85% in sales growth and more than 25% in gross margin.

There are some efforts to use analytics in the remittance industry. For example, current systems use analytics to understand global remittance market trends. Others use analytics to discover glitches or behavior anomalies and detect and prevent fraud. Most focus on overall trends and patterns, not individual behaviors, to gain insights for unique customer offerings. Currently, there are no efforts to develop lightweight personalized analytics methodologies to gain insights for customized services real time.

These and other drawbacks exist.

SUMMARY OF THE INVENTION

Accordingly, one aspect of the invention is to address one or more of the drawbacks set forth above. An embodiment of the present invention is directed to a system for dynamically optimizing communication data relating to dynamic lightweight personalized analytics (DLPA). The system comprises: an interface that receives one or more inputs via an enterprise payments services bus; a data store that stores and manages arrays of data structures comprising key performance indicators (KPIs), DLPA metrics and support data; and a dynamic lightweight personalized analytics engine comprising a computer processor and coupled to the data store and the interface, the computer processor configured to perform the steps of: receiving one or more customer parameters and remittance trends, wherein the one or more customer parameters comprise social media data, support data and communications data; accessing, via a customer account database, one or more key performance indicators (KPIs); accessing one or more DLPA metrics; wherein the DLPA metrics are impacted by one or more responses to a customer remittance suggestion; responsive to the KPI and DLPA metrics, adjusting a size of a data array for a predetermined time window for an individual customer; the step of adjusting comprising: comparing an initial test period with a count trigger; calculating a new set of values for KPIs and one or more impact metrics for the initial test period; determining whether an impact metric is greater than or equal to a metric threshold; if the impact metric is greater than or equal to the metric threshold, then increasing a priority of recommendation acceptance rate (RAR) or recommendation impact (RI) and increasing the size of the data array; if the impact metric is less than the metric threshold, then decreasing a metric count and decreasing a priority of recommendation acceptance rate (RAR) or recommendation impact (RI) and decreasing the size of the data array; dynamically processing a plurality of transaction data based on the one or more adjusted at least one array to achieve memory conservation and optimal computation; based on the adjusting step, generating a set of remittance suggestions and financial suggestions; and communicating the set of remittance suggestions and financial suggestions.

Another embodiment of the present invention is directed to method for dynamically optimizing communication data relating to dynamic lightweight personalized analytics (DLPA). The method comprises the steps of: receiving one or more customer parameters and remittance trends, wherein the one or more customer parameters comprise social media data, support data and communications data; accessing, via a customer account database, one or more key performance indicators (KPIs); accessing one or more DLPA metrics; wherein the DLPA metrics are impacted by one or more responses to a customer remittance suggestion; responsive to the KPI and DLPA metrics, adjusting a size of a data array for a predetermined time window for an individual customer; the step of adjusting comprising: comparing an initial test period with a count trigger; calculating a new set of values for KPIs and one or more impact metrics for the initial test period; determining whether an impact metric is greater than or equal to a metric threshold; if the impact metric is greater than or equal to the metric threshold, then increasing a priority of recommendation acceptance rate (RAR) or recommendation impact (RI) and increasing the size of the data array; if the impact metric is less than the metric threshold, then decreasing a metric count and decreasing a priority of recommendation acceptance rate (RAR) or recommendation impact (RI) and decreasing the size of the data array; dynamically processing a plurality of transaction data based on the one or more adjusted at least one array to achieve memory conservation and optimal computation; based on the adjusting step, generating a set of remittance suggestions and financial suggestions; and communicating the set of remittance suggestions and financial suggestions.

According to another embodiment of the present invention, a computer-readable medium comprising instructions which, when executed by a computer, cause the computer to carry out steps of: receiving one or more customer parameters and remittance trends, wherein the one or more customer parameters comprise social media data, support data and communications data; accessing, via a customer account database, one or more key performance indicators (KPIs); accessing one or more DLPA metrics; wherein the DLPA metrics are impacted by one or more responses to a customer remittance suggestion; responsive to the KPI and DLPA metrics, adjusting a size of a data array for a predetermined time window for an individual customer; the step of adjusting comprising: comparing an initial test period with a count trigger; calculating a new set of values for KPIs and one or more impact metrics for the initial test period; determining whether an impact metric is greater than or equal to a metric threshold; if the impact metric is greater than or equal to the metric threshold, then increasing a priority of recommendation acceptance rate (RAR) or recommendation impact (RI) and increasing the size of the data array; if the impact metric is less than the metric threshold, then decreasing a metric count and decreasing a priority of recommendation acceptance rate (RAR) or recommendation impact (RI) and decreasing the size of the data array; dynamically processing a plurality of transaction data based on the one or more adjusted at least one array to achieve memory conservation and optimal computation; based on the adjusting step, generating a set of remittance suggestions and financial suggestions; and communicating the set of remittance suggestions and financial suggestions.

The computer implemented system, method and medium described herein provide unique advantages to entities, organizations, merchants, and other users (e.g., consumers, etc.), according to various embodiments of the invention. An embodiment of the present invention is directed to dynamically selecting communications messages, social media, support and other data (denoted data) in optimizing dynamic lightweight personalized analytics (DLPA). The new innovative technology is designed to provide individual analytics to gain insights for developing personalized offerings to build relationships with the customer. DLPA leverages a limited number of customer-specific, industry-focused input parameters, other inputs such as communications and other data, and a small footprint. These parameters are placed in data structures to assist in processing DLPA-related actions. This invention focuses on dynamically selecting the data to optimize efficiencies.

These and other advantages will be described more fully in the following detailed description.

BRIEF DESCRIPTION OF THE DRAWINGS

To facilitate a fuller understanding of the present inventions, reference is now made to the appended drawings. These drawings should not be construed as limiting the present inventions but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a system and methodology for dynamically resizing data structures and the fraction of local and global parameters used in dynamic lightweight personalized analytics (DLPA). An embodiment of the present invention is directed to providing individual analytics to gain insights for developing personalized offerings to build relationships with the customer. DLPA leverages a limited number of customer-specific, industry-focused input parameters, other inputs, and a small footprint. These parameters are placed in data structures to assist in processing DLPA-related actions. An embodiment of the present invention focuses on adjusting the size of these structures, and the fraction of parameters that are local, to optimize efficiencies.

Figure 1:
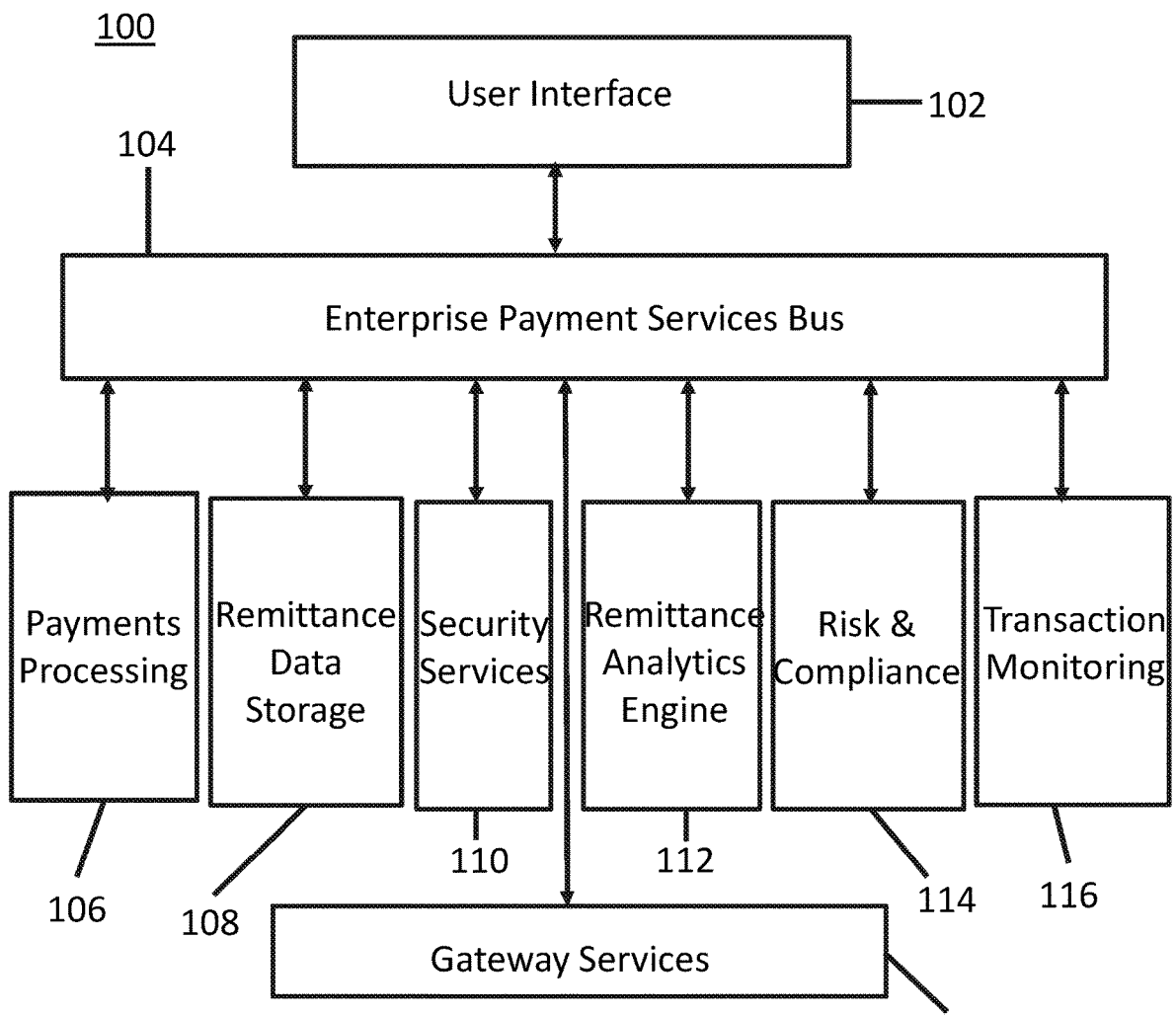
FIG. 1 is a block diagram of a remittance payments service-oriented architecture, in accordance with exemplary embodiments of the disclosure.

FIG. 1 is a schematic block diagram illustrating one embodiment of the service-oriented architecture (SOA) 100 of a remittance system designed to process transactions, in accordance with one embodiment of the present invention. The system 100, in one embodiment, includes a user interface 102 that enables a user to send or receive requests, etc. This user interface 102 interacts with the enterprise payments services bus 104 to request and/or receive services. The enterprise payments services bus 104 may be configured to transmit data between engines, databases, memories, and other components of the system 100 for use in performing the functions discussed herein.

The enterprise payments services bus 104 may include one or more communication types and utilize various communication methods for communications within a computing device. For example, the enterprise payments services bus 104 may include a bus, contact pin connectors, wires, etc. In some embodiments, the enterprise payments services bus 104 may also be configured to communicate between internal components of system 100 and external components accessible through gateway services 118, such as externally connected databases, display devices, input devices, etc.

There are several services that may compose this SOA 100, including payments processing 106, remittance data storage 108, security services 110, the remittance analytics engine 112, risk and compliance 114, transaction monitoring 116, and gateway services 118, which are described below. Each of these service components may be software, a computer-readable program, executing on one of more processors and may include a mainframe computer, a workstation, a desktop computer, a computer in a smart phone, a computer system in a rack, a computer system in a cloud, a physical system, a virtual system, and the like.

The system 100, in one embodiment, is the SOA of a remittance system and is a network of software service components in which the illustrative embodiments may be implemented. The system 100 includes a user interface 102 used by a consumer. The consumer represents a person, a software program, a virtual program or any other entity that has possession of, can emulate, or other otherwise issue commands to execute transactions in the system 100. The system 100 includes an enterprise payment services bus 104 which accepts and processes commands from the user interface 102 and other system components. It also enables communication among the various services components in the system 100.

As a part of executing a remittance request, the transaction may leverage payments processing 106 to process the request. The transaction may also access remittance data storage 108 which is a resource for data access. Security services 110 are also leveraged to ensure the full security and integrity of funds and data, and to detect and prevent fraud. In addition, the remittance analytics engine 112 may be leveraged and server as the foundation for LPA. This engine takes as input a plethora of information from the remittance data storage 108 and other components that may enable the remittance analytics engine 112 to optimize its outputs. The risk and compliance service 114 may provide customer identification, verification and other similar services to comply with relevant governmental regulations and to minimize risk. The transaction monitoring 116 service tracks funds transfer behavior and other activities to detect anomalies that may point to fraud. It works in concert with security services 110.

Gateway services 118 enable the transfer of funds, data, requests, etc. to externally connected entities for further processing. Such entities may include a computer network, a financial institution, and others that may participate in end-to-end remittance or other funds transfer or data services. Other similar embodiments will be apparent to persons having skill in the relevant art.

Figure 2:
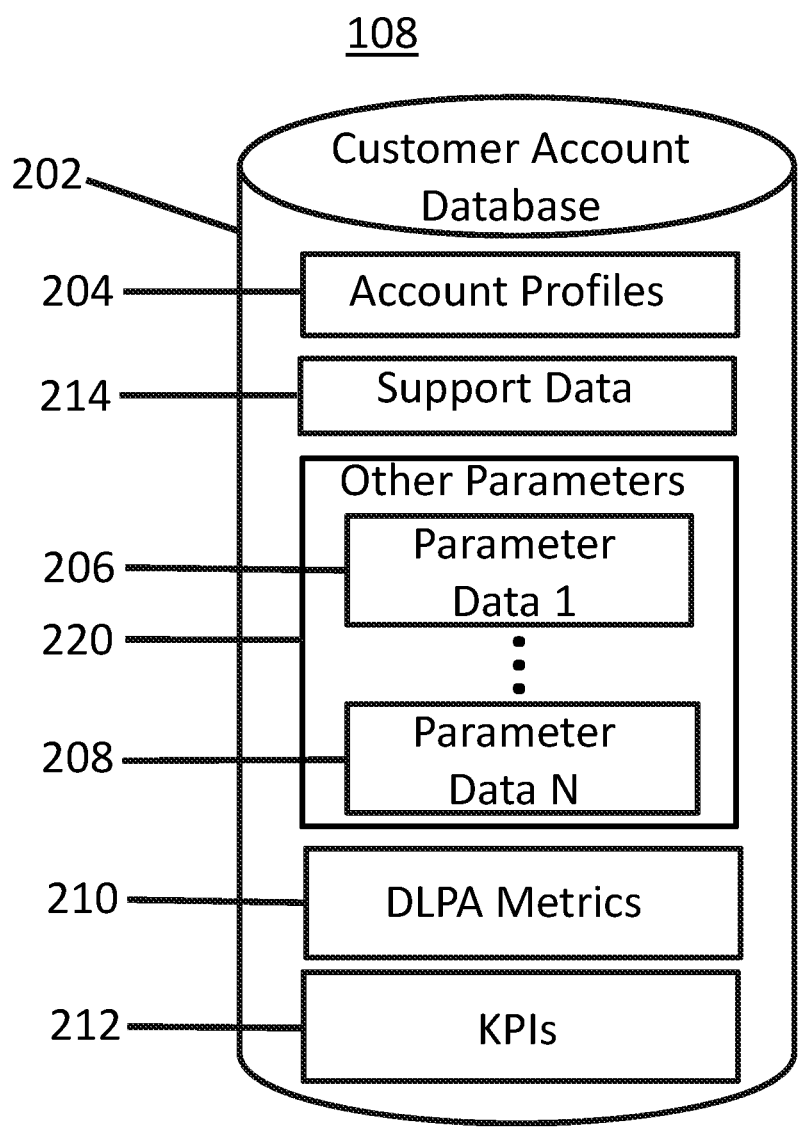
FIG. 2 is a block diagram of a remittance data storage, in accordance with exemplary embodiments of the disclosure.

FIG. 2 is a schematic block diagram illustrating one embodiment of the remittance data storage service 108 used in the processing of information requests. The remittance data storage 108 may represent a relational database, or a collection of relational databases, that utilizes structured query language for the storage, identification, modifying, updating, accessing, etc. of structured data sets stored therein. This data storage 108 may include a customer account database 202 that contains customer account and other related customer information. The customer account database 202 may be configured to store a plurality of consumer account profiles 204 as well as a plurality of customer parameter data 206 and 208 using a suitable data storage format and schema.

Each customer account profile 204 may be a structured data set configured to store data related to a remittance account. Each customer account profile 204 may include at least the customer's full name, address, telephone number, birthdate, birth country, a remittance account number, a bank account number, credit card account information, email address, a list of recipients and associated international mobile telephone numbers, remittance transaction history, a postal mailing address, an email address, and other relevant information. The customer account profile 204 may also include additional information suitable for customer service programs, customer and vendor optimizations, and regulations, such as product data, offer data, loyalty data, reward data, usage data, currency-exchange data, mobile money data, fraud scoring, validity of funds, and transaction/account controls. The customer account profile 204 may also include additional information that may be required for know-your-customer (KYC) and anti-money laundering (AML) regulations. It may further contain information suitable for performing the functions discussed herein, such as communication details for transmitting via the enterprise payment services bus 104.

The customer parameter data 206 and 208 may be a wealth of various types or facts or other data (see FIG. 3) about the customer. It is a component of other parameters 220 that may be used as input or output information for the remittance analytics engine 112. The other parameters 220 may also include OP-Max (maximum number of other parameters (OPs) considered per customer), the maximum number of other parameters 220 considered per customer, and OP-Count-Trigger, used to determine when to remove or replace another parameter 220. OP-Max also represent the size of the other parameter 220 array per customer. Both OP-Max and OP-Count-Trigger may be adjusted dynamically, according to an embodiment of the present invention.

The customer account database 202 may also include DLPA metrics 210 designed to quantify success. Example DLPA metrics may include the recommendation acceptance rate, recommendation impact, acceptance impact, financial account acceptance rate, and financial recommendation impact. Other DLPA metrics may be applied. In addition, those skilled in the art will understand this is a representative embodiment. There are other similar metrics that may be used in other embodiments of the present invention. DLPA metrics may be used to trigger when to dynamically update parameters or resources used.

The customer parameter data 206 and 208 may also include the customer temperament information, which may be predicted via social media data 308 or the number of times the customer contacts support, for example. Exemplary support data 214 may include type of support inquiry, how it was resolved, response time, resolution time, frequency of support contact, customer satisfaction data and other similar metrics. Furthermore, the customer account database 202 may include key performance indicators (KPIs) 212. Exemplary KPIs 212 may include total funds transferred per customer, total number of transfers per customer, total number of recipients per customer and total balances in all financial accounts per customer.

Figure 3:
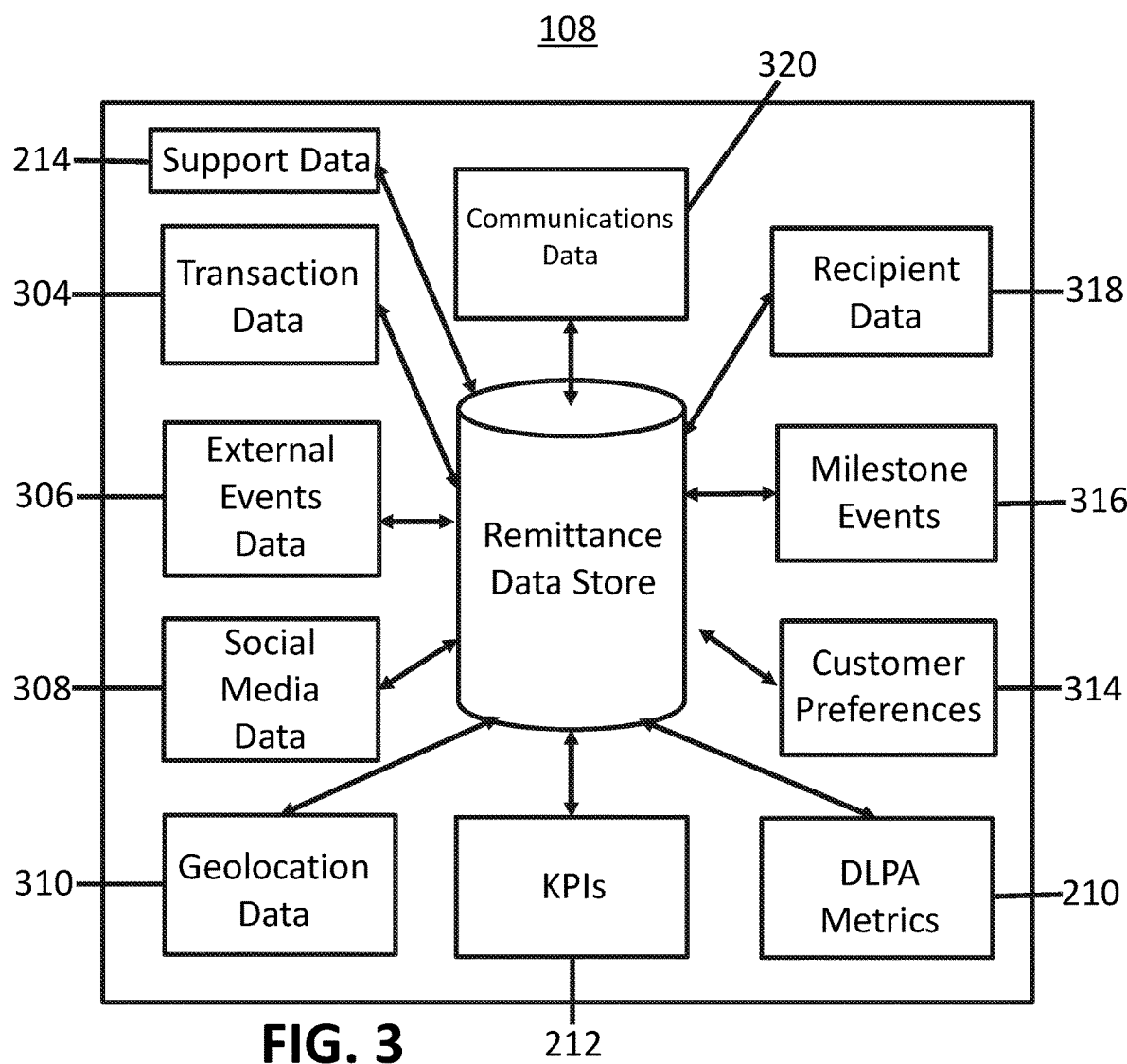
FIG. 3 is a block diagram of the types of data stored in a remittance data storage, in accordance with exemplary embodiments of the disclosure.

FIG. 3 represents a schematic block diagram illustrating one embodiment of specifics regarding the plurality of data that may be stored in the remittance data storage 108. This data may be stored as structured data sets that may include support data 214, transaction data 304, external events data 306, social media data 308, geolocation data 310, KPIs 212, DLPA metrics 210, customer preferences 314, milestone events 316, recipient data 318 and communications data 320.

Example transaction data 304 may include the transfer amount, transfer time, recipient name and international mobile number, the time period since the last transfer initiated by the sender to any receiver, time period since the last transfer initiated by the sender to a specific receiver, and the final status of a transaction (e.g., completed, cancelled, etc.). Additional data may include metrics to quantify customer sentiments such as the number of times or frequency that the customer contacted support, time with support, and support outcomes.

Example external events data 306 include general remittance transaction data (e.g., transfer amounts, frequency, etc.) for other customers using the specific remittance service or for remittance customers using any remittance service, public holidays for the sender and receiver countries, natural disasters, immigration policies, the price of oil, global and local recessions.

Example social media data 308 may include posts and other exchanges in Facebook, Twitter, Instagram, LinkedIn and other similar social media platforms.

Example geolocation data 310 may include the physical location of the sender and receiver when the funds transfer is initiated or received or the physical location of the sender or receiver at specific or random times. Other similar embodiments will be apparent to persons having skill in the relevant art.

Example customer preferences 314 are from the perspective of the sender. They may include hobbies, favorite things to do and financial preferences. Furthermore, LPA enables the creation of a financial or other count by the customer to save for the future. This account may be created and funded statically and/or dynamically. A customer preference 314 may include the customer's desire to create a separate account (or some other activity) based on DLPA analytics, to choose the type of account to create and to determine how to fund the account. A customer preference 314 may be to create a financial or other account when registering for the remittance service, or upon DLPA recommendations when using the remittance service. There are many types of accounts to be created. The customer may choose between creating a bank account for education, starting a business, donating to a charity or some other option for the sender and/or the receiver. The choices may be general (e.g., the same type of account for sender and each recipient), for each recipient, or variable (e.g., a different type of account depending on the recipient or a group of recipients). Other similar embodiments will be apparent to persons having skill in the relevant art.

Example milestone events 316 may include birthdays, including milestone birthdays (e.g., 18, 25, 30, etc.), weddings, anniversaries, graduations, and other special days for the sender or receiver.

Example recipient data 318 may include full name, international telephone number and recipient preferences that are like customer preferences 314.

Communications data 320 may include the recent types of communications between sender, receiver, the remittance service provider and external entities. This includes SMS messages, email and communication types. Other similar embodiments will be apparent to persons having skill in the relevant art.

Figure 4:
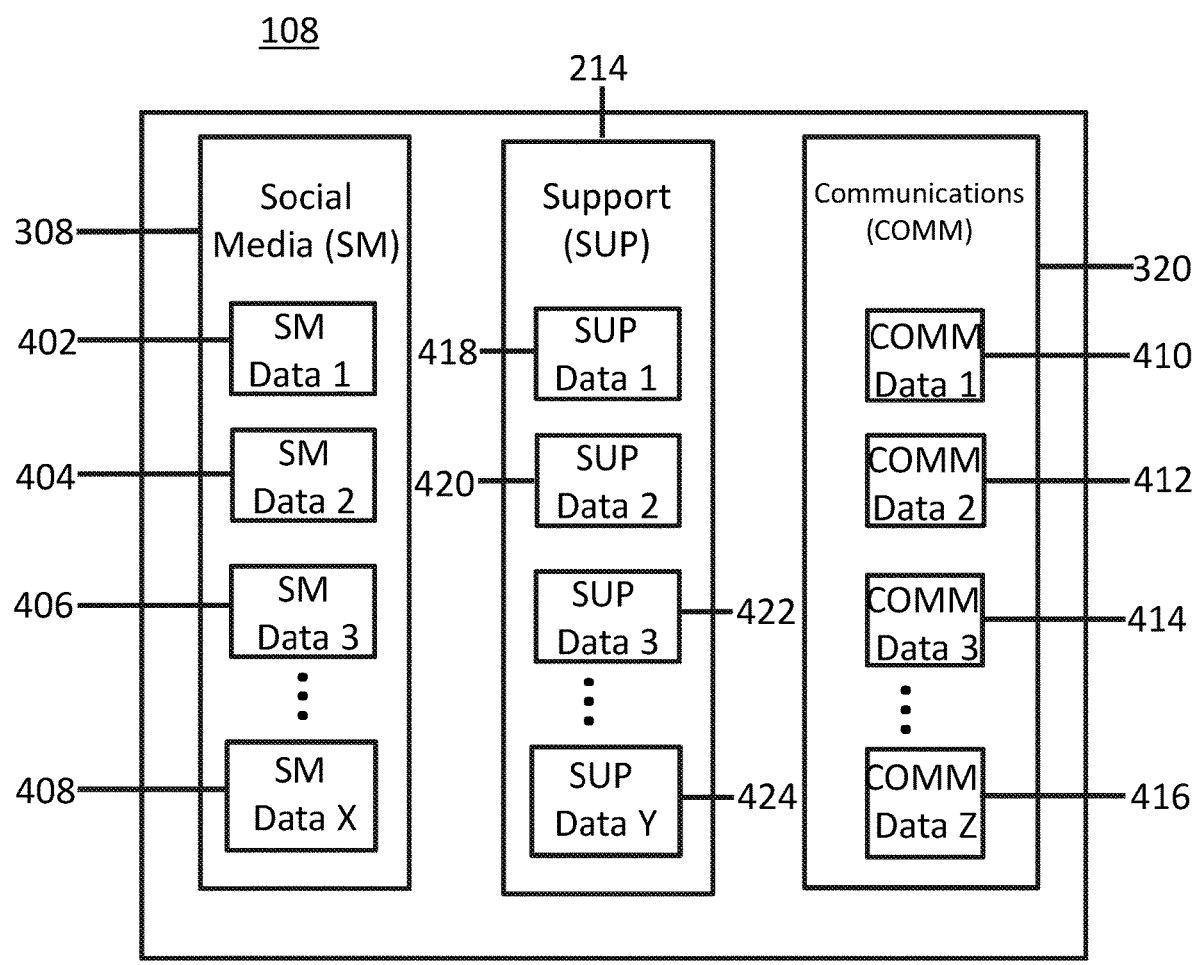
FIG. 4 is a block diagram of the partial contents of a remittance data store, in accordance with exemplary embodiments of the disclosure.

FIG. 4 is a schematic block diagram illustrating one embodiment of partial contents of the remittance data storage 108. It contains a plurality of social media data 308: 402, 404, 406, and 408; support data 214: 418, 420, 422, and 424; and communications data 320: 410, 412, 414, and 416. Associated with each of these types of data are its associated impact; the social media impact, support impact and communication impact. These metrics may also be stored in the remittance data storage 108, although not shown in FIG. 4. Each impact metric may be calculated as the fraction of favorable outcomes for social media, support and communications, respectively, resulting in an increase in at least one KPI in customer's KPI-Array.

The plurality of social media 308, support 214, and communications data 320 may be stored in relevant arrays in of size X, Y and Z, respectively. The size of these arrays can vary, as described in detail in related U.S. Provisional Patent Application No. 62/927,872, the contents of which are incorporated by reference herein in their entirety.

Figure 5:
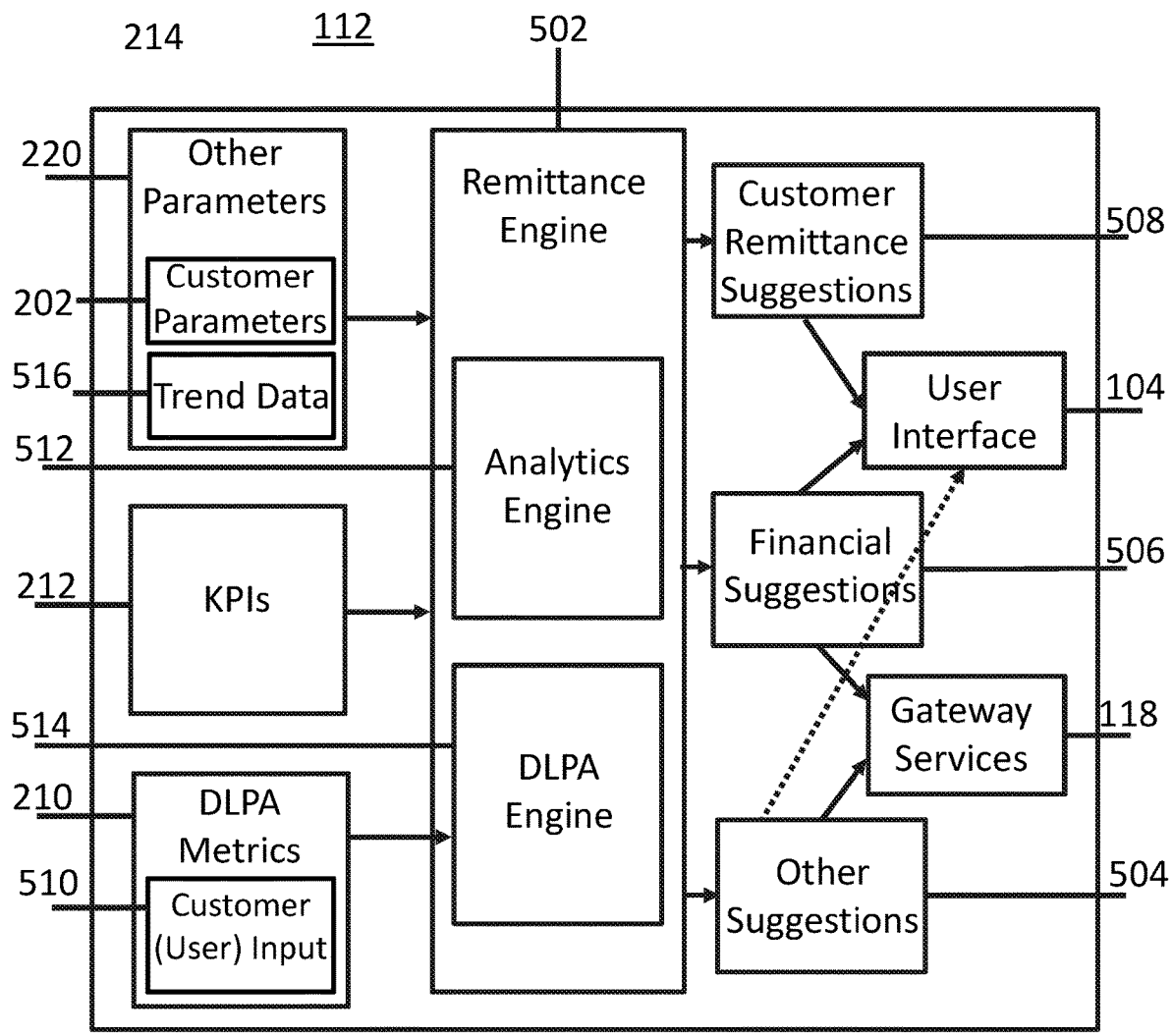
FIG. 5 is a block diagram of the dynamic lightweight personalized analytics (DLPA) engine, including the customer parameters that partially compose the communications and other data, in accordance with exemplary embodiments of the disclosure.

FIG. 5 is a schematic block diagram illustrating one embodiment of the remittance analytics engine 112, the foundation for DLPA. It includes the analytics engine 502, which accepts customer parameters 202 and remittance trends 516 as input. Examples of remittance trend data include average remittance amounts over all customers, remittance frequencies and time frames, remittance geographies, remittance increases over holidays or special occasions, and other similar metrics. Customer parameters 202 may include social media 308, support 214, and communications data 320 as well as other data. They collectively form the other parameters 220 set of inputs. Other input metrics include the KPIs 212 and DLPA metrics 210. The DLPA metrics 210 are impacted by responses to customer remittance suggestions 508. Such responses are contained in the customer input data 510, a component of the DLPA metrics 210. Outputs for the analytics engine 502 include customer remittance suggestions 508, financial suggestions 506 and other suggestions 504.

The customer remittance suggestions 508, financial suggestions 506 and other suggestions 504 may communicate their suggestions to the customer through the user interface 104. The financial suggestions 506 and other suggestions 504 communicate their suggestions to external entities (e.g., banks) via gateway services 118.

The analytics engine 502 may represent a primary computational engine for leveraging predictive, customer behavioral and other analytics techniques for optimal customer remittance suggestions 508, financial suggestions 506 and other suggestions 504 for DLPA. It further utilizes a plurality of customer parameters 202, including social media 308, support 214, and communications data 320, remittance trends 516, KPIs 212 and DLPA metrics 210 as input for its calculations. This invention describes how the number, type, etc. of social media 308, support 214, and communications data 320 can be dynamically adjusted for optimal impact on financial 506 and other suggestions 504, as well as DLPA KPIs 212.

Customer remittance suggestions 508 may include recommendations for sending additional funds to one or a plurality of recipients, increasing the frequency of sending funds to one or a plurality of recipients, or other similar suggestions. Moreover, the customer may agree to specific transfer amounts and frequency, based on certain analytics triggers, upon customer registration, by default or dynamically. Financial suggestions 506 may include creating one or a plurality of finance accounts, based on customer preferences 314. The type and number of accounts may be determined upon customer registration for the remittance service, by default, or dynamically. The number, type or frequency of other suggestions 504 may be determined in a similar manner.

According to an embodiment of the present invention, the maximum size of the support, social media and communication arrays containing the data used by DLPA is to be as small as possible. This is to facilitate a small memory footprint while optimizing KPIs 212. In addition, these data metrics have an impact on the recommendation acceptance rate (RAR) and recommendation impact (RI).

Figure 6A:
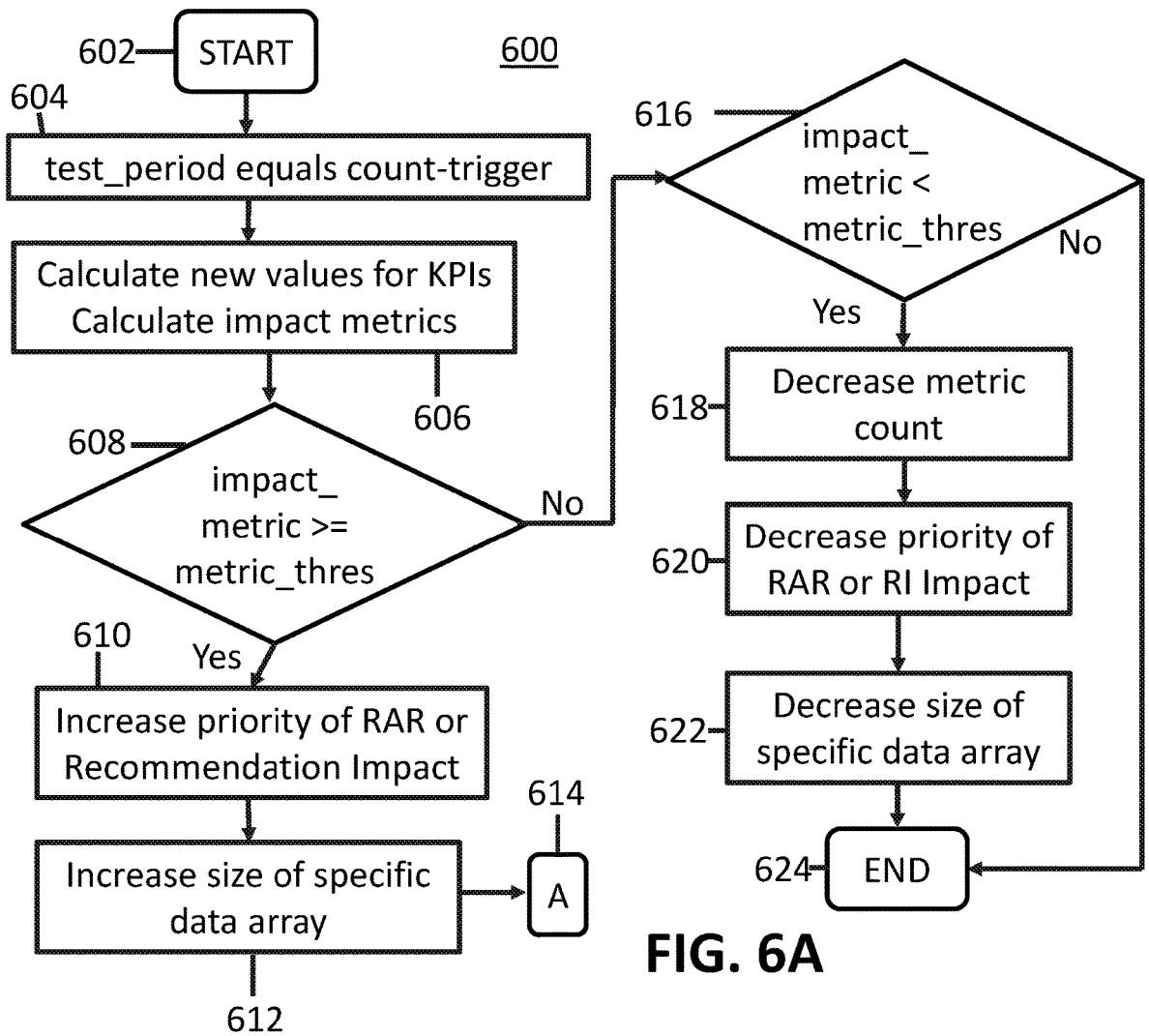
FIGS. 6A and 6B collectively represent a flowchart illustrating an exemplary method for adjusting the data impact array sizes and recommendation-related priorities to be used by DLPA, in accordance with exemplary embodiments of the disclosure.
Figure 6B:
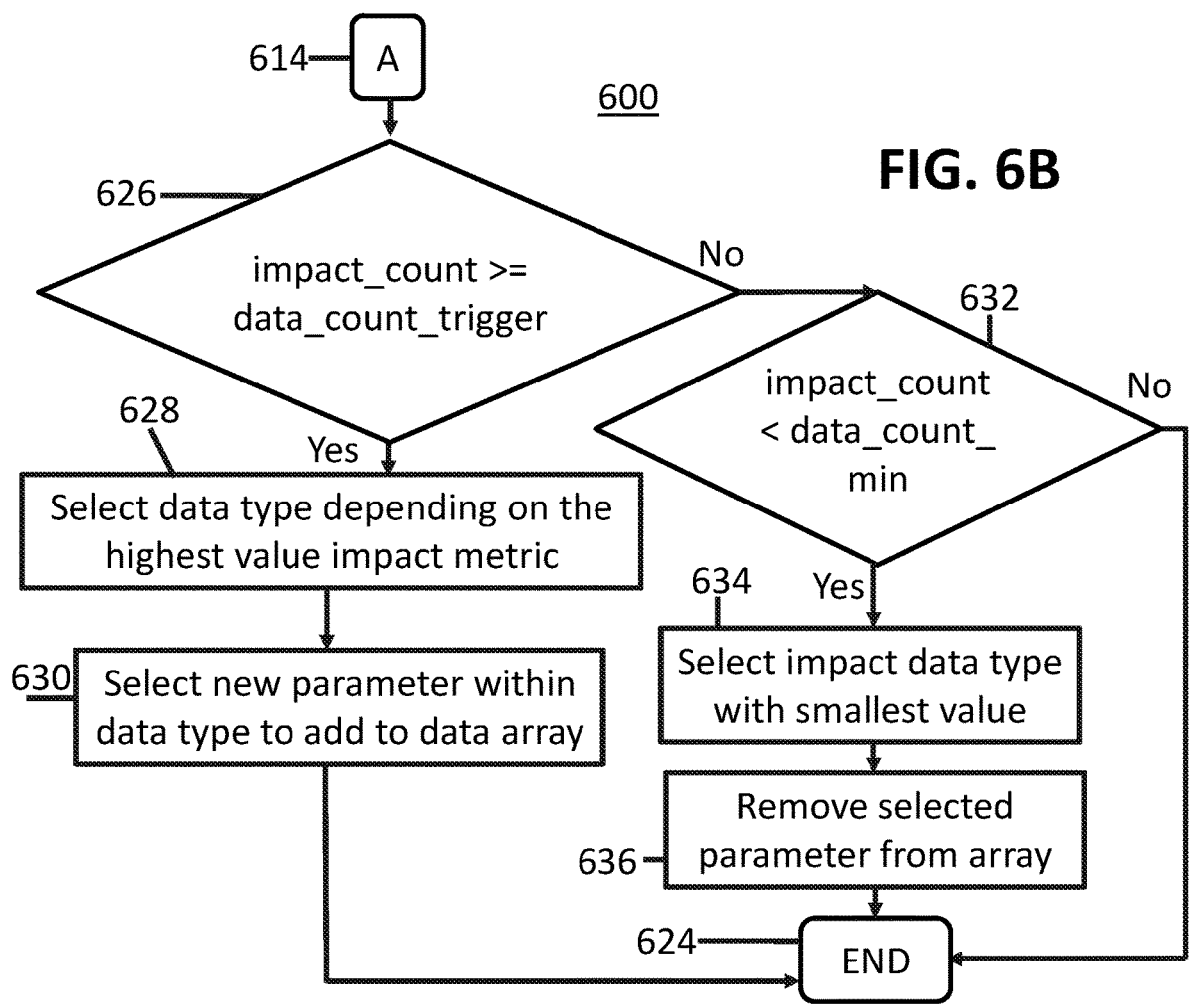

FIGS. 6A and 6B collectively represent a flowchart illustrating an exemplary method for adjusting the data impact array sizes and recommendation-related priorities to be used by DLPA, in accordance with exemplary embodiments of the disclosure. As shown in FIG. 6A, 600 represents a schematic block diagram illustrating a method for dynamically changing the size of these data arrays, as well as how this data impacts the RAR and RI, and the count triggers. RAR represents a recommendation acceptance rate which may include the fraction of all recommendations per customer accepted. RI represents a recommendation impact which may include the fraction of all recommendations resulting in an increase in at least one KPI (e.g., new KPI value>=current KPI value) in KPI-Array.

The method starts at 602 by determining an initial test period has been reached by comparing this parameter with the count-trigger, at 604. This may be represented as TW-Trigger if the test_period is a time window, or count-trigger number of transactions occurring since the last check if the test_period is the number of transactions. TW-Trigger may represent the number of time windows surpassed before executing decision-making actions (e.g., executing an action if a KPI has reached its minimum value). Count-trigger may be DPLA-Count-Trigger, OP-Count-Trigger, Rec-Count-Trigger or KPI-Count-Trigger or another similar metric. If this is true, then new KPIs 212 and impact metrics (e.g., SI, SMI and CI) may be calculated for this test_period, at 606. SI may represent support impact which may include a fraction of support outcomes that result in an increase in at least one KPI in customer's KPI-Array. SMI may represent social media impact which may include a fraction of social media outcomes that result in an increase in at least one KPI in customer's KPI-Array. CI may represent a communications impact which may include a fraction of communications outcomes that result in an increase in at least one KPI in customer's KPI-Array.

Next, step 608 may determine if the impact metric is greater than or equal to the metric threshold. If yes, then the priority of the RAR or RI (or both) may be increased at 610. This enables DLPA to keep one or both of these parameters in the DLPA-Array, which is part of DLPA Metrics 210. In addition, the size of the relevant data array may also be increased at 612. This is followed by additional steps detailed beginning with A, at 614 in FIG. 6B. According to an exemplary scenario, metric_threshold may be a range, with maximum and minimum values. As such, the metric_threshold 608 may represent a maximum value for this metric.

If the impact metric is less than the metric_threshold, in this case the minimum value for this metric at 616, then the count for this metric (e.g., SI_Count, SMI_Count or CI_Count) may be decreased, at 618. Next, the priority of RAR, RI or RAR and RI may be decreased at 620, and the size of the relevant data array may be decreased, at 622. The relevant array may represent the one that contains the parameters for the specific data type (e.g., support, social media, communication, etc). This ends the method 624.

However, if the impact_metric is not less than the minimum value of the metric_threshold at 616, then the method ends at 624.

As shown in FIG. 6B, process 600 may further illustrates a continuation of this methodology, beginning with A, at 614. In this example, data_count_trigger may represent an impact count needed to prioritize adding the associated data type to the selection of parameters to be considered by DLPA. Likewise, data_count_min may represent the minimum impact count needed to keep the associated data type as a parameter to be considered in DLPA. If the value of impact_count is greater than or equal to data_count_trigger at 626, then an embodiment of the present invention may select the data type with the highest value impact metric at 628. Next, an embodiment of the present invention may select a new parameter within the specific data type to be added to the data array at 630, then end the method at 624.

If the impact count is not greater than or equal to data_count_trigger at 626, then an embodiment of the present invention may check to see if impact_count is less than data_count_min at 632. If yes, an embodiment of the present invention may select the impact data type with the smallest value at 634, then remove a selected parameter in this data type from the array at 636. This ends the flow at 624. If impact_count is not less than data_count_min at 632, then the method ends at 624.

DLPA Metrics may represent parameters used in DLPA methodology. Exemplary metrics may include the following:

RAR: recommendation acceptance rate; the fraction of all recommendations per customer accepted RI: recommendation impact; the fraction of all recommendations resulting in an increase in at least one KPI (new KPI value>=current KPI value) in KPI-Array AI: acceptance impact; the fraction of all customer accepted recommendations resulting in an increase in at least one KPI in KPI-Array AAR: financial account acceptance rate; the fraction of all financial account recommendations per customer accepted FRI: financial recommendation impact; fraction of all financial account recommendations resulting in an increase in at least one KPI in KPI-Array ORI: other recommendations impact; fraction of all non-financial-account recommendations resulting in an increase in at least one KPI in KPI-Array Rec-Array: an array of past recommendations to the customer, including the type of recommendation (e.g., financial or other), and whether accepted Rec-Array-Max: the maximum number of entries in the Rec-Array DLPA-Array: a collection the DLPA metrics of focus per customer, and whether it favorably impacted each KPI per customer DLPA-Count-Trigger: used to determine when to remove or replace a DLPA metric DLPA-Max: the maximum number of DLPA metrics considered per customer REMOVE: a flag to determine whether to remove or replace a DLPA metric in DLPA-Array Key Performance Indicators (KPIs) may be stored as an array of data and may include the following:

TFT: Total funds transferred per customer (sender)

TFT-Min: the minimum value for TFT

TNT: Total number of transfers per customer

TB: Total balances in all financial accounts per customer

TB-Min: the minimum value for TB

NR: Total number of recipients per customer

NFA: Total number of financial accounts per customer

KPI-Array: a collection the KPIs of focus per customer

KPI-Max: the maximum number of KPIs considered per customer

KPI-Count-Trigger: used to determine when to remove or replace a KPI

LG-Mix may represent a fraction of all DLPA suggestions (local and global) that are local.

Other Parameters may include DLPA parameter and trend data described in U.S. Provisional Application No. 62/868,950 and U.S. patent application Ser. No. 16/914,629, the contents of which are incorporated herein in their entirety.

Examples include the LG-Mix, transaction data, external events, social media data, geolocation data, communications data, recipient data, milestone events, trend data, etc.

SI: support impact; fraction of favorable support outcomes resulting in an increase in at least one KPI in customer's KPI-Array SI_Count: number of times the minimum SI value is reached over several test periods; typically, a minimum and maximum value support_max: maximum number of support data metrics to consider in DLPA support_threshold: desirable value for SI; typically, a minimum and maximum value SMI: social media impact; fraction of favorable social media outcomes resulting in an increase in at least one KPI in customer's KPI-Array SMI_Count: number of times the minimum SMI value is reached over several test periods; typically a minimum and maximum value media_max: maximum number of social media metrics to consider in DLPA media_threshold: desirable value for SMI; typically, a minimum and maximum value CI: communications impact; fraction of favorable communications outcomes resulting in an increase in at least one KPI in customer's KPI-Array CI_Count: number of times the minimum CI value is reached over several test periods;

typically a minimum and maximum value comm_max: maximum number of communication data metrics to consider in DLPA comm_threshold: desirable value for CI; typically, a minimum and maximum value OP-Array—an array of other parameters used for the specific customer OP-Max: the maximum number of OPs considered per customer OP-Count-Trigger: used to determine when to remove or replace an OP metric Service-oriented architecture (SOA)—systems design for services components.

Social Media Data (SM)—information deriving from the customer's social media accounts, e.g., FaceBook, Instagram, Twitter, linkedIn, etc. This includes posted data, likes and metadata such as picture or table captions, etc.

Software service—computer code, potentially modular, that provides a service.

Support data (SUP)—information associated with the specific customer's support. Examples include response time, resolution time, customer satisfaction metrics, call wait time, first call resolution and the number of times a customer requests support within a given time frame.

test_period—time window, number of transactions or other similar metric used for a snapshot of activity.

TW—time window, the given time frame for calculating parameters.

TW-Trigger—the number of time windows surpassed before executing decision-making actions (e.g., executing an action if a KPI has reached its minimum value)

Reference throughout this specification to "one embodiment," "an embodiment," or similar language means that a feature, structure, or characteristic described about the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labelled as modules, to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The invention claimed is:

1. A system for dynamically optimizing communication data relating to dynamic lightweight personalized analytics (DLPA), the system comprising:
   an interface that receives one or more inputs via an enterprise payments services bus;
   a data store that stores and manages arrays of data structures comprising key performance indicators (KPIs), DLPA metrics and support data; and
   a dynamic lightweight personalized analytics engine comprising a computer processor and coupled to the data store and the interface, the computer processor configured to perform the steps of:
  receiving one or more customer parameters and remittance trends, wherein the one or more customer parameters comprise social media data, support data, communications data, and geolocation data;
  accessing, via a customer account database, one or more key performance indicators (KPIs);
  accessing one or more DLPA metrics; wherein the DLPA metrics are impacted by one or more responses to a customer remittance suggestion;
  responsive to the KPI and DLPA metrics, adjusting a size of a data array for a predetermined time window for an individual customer; the step of adjusting comprising:
    comparing an initial test period with a count trigger;
    calculating a new set of values for KPIs and one or more impact metrics for the initial test period;
    determining whether an impact metric is greater than or equal to a metric threshold;
      if the impact metric is greater than or equal to the metric threshold, then increasing a priority of recommendation acceptance rate (RAR) or recommendation impact (RI) and increasing the size of the data array;
      if the impact metric is less than the metric threshold, then decreasing a metric count and decreasing a priority of recommendation acceptance rate (RAR) or recommendation impact (RI) and decreasing the size of the data array;
    dynamically processing a plurality of transaction data based on the one or more adjusted at least one array to achieve memory conservation and optimal computation;
    based on the adjusting step, generating a set of remittance suggestions and financial suggestions; and
    communicating the set of remittance suggestions and financial suggestions.

2. The system of claim 1, the count trigger represents a number of time windows surpassed before executing a decision making action or a number of transactions occurring since a last check.

3. The system of claim 1, wherein the one or more impact metrics comprise support impact (SI) metrics that represent a fraction of support outcomes resulting in an increase in at least one KPI in a customer array; social media impact (SMI) metrics that represent a fraction of social media outcomes resulting in an increase in at least one KPI in a customer array and communications impact that represents a fraction of communication outcomes resulting in an increase in at least one KPI in a customer array.

4. The system of claim 1, wherein if the impact metric is greater than or equal to the metric threshold, the computer processor is further configured to perform the steps of:
  determining whether an impact count is greater than or equal to a data count trigger wherein the impact count prioritizes adding a data type to a selection of parameters to be considered in DLPA;
  if the impact count is greater than or equal to the data count trigger, then selecting a data type depending on a highest value impact metric and selecting a new parameter within the data type to add to the data array;
  if the impact count is less than the data count trigger, then determining whether the impact count is less than a data count minimum, wherein the data count minimum represents a minimum impact count needed to keep the data type as a parameter to be considered in DLPA.

5. The system of claim 1, wherein if the impact count is less than a data count minimum, then selecting an impact data type with a smallest value and removing the selected parameter from the data array.

6. The system of claim 1, wherein the support data comprises type of support inquiry, resolution, response time, resolution time, frequency of support contact, customer satisfaction data.

7. The system of claim 1, wherein the DLPA metrics comprise one or more of: recommendation acceptance rate; recommendation impact; acceptance impact, financial account acceptance rate; financial recommendation impact, an array of past recommendations to the customer; support impact and communications impact.

8. The system of claim 1, wherein KPI represents total funds transferred; total number of transfers, total balances, total number of recipients, and total number of financial accounts.

9. A method for dynamically optimizing communication data relating to dynamic lightweight personalized analytics (DLPA), the method comprising the steps of:
  receiving one or more customer parameters and remittance trends, wherein the one or more customer parameters comprise social media data, support data, communications data, and geolocation data;
  accessing, via a customer account database, one or more key performance indicators (KPIs);
  accessing one or more DLPA metrics; wherein the DLPA metrics are impacted by one or more responses to a customer remittance suggestion;
  responsive to the KPI and DLPA metrics, adjusting a size of a data array for a predetermined time window for an individual customer; the step of adjusting comprising:
    comparing an initial test period with a count trigger;
    calculating a new set of values for KPIs and one or more impact metrics for the initial test period;
    determining whether an impact metric is greater than or equal to a metric threshold;
      if the impact metric is greater than or equal to the metric threshold, then increasing a priority of recommendation acceptance rate (RAR) or recommendation impact (RI) and increasing the size of the data array;
      if the impact metric is less than the metric threshold, then decreasing a metric count and decreasing a priority of recommendation acceptance rate (RAR) or recommendation impact (RI) and decreasing the size of the data array;
    dynamically processing a plurality of transaction data based on the one or more adjusted at least one array to achieve memory conservation and optimal computation;
    based on the adjusting step, generating a set of remittance suggestions and financial suggestions; and
    communicating the set of remittance suggestions and financial suggestions.

10. The method of claim 9, the count trigger represents a number of time windows surpassed before executing a decision making action or a number of transactions occurring since a last check.

11. The method of claim 9, wherein the one or more impact metrics comprise support impact (SI) metrics that represent a fraction of support outcomes resulting in an increase in at least one KPI in a customer array; social media impact (SMI) metrics that represent a fraction of social media outcomes resulting in an increase in at least one KPI in a customer array and communications impact that represents a fraction of communication outcomes resulting in an increase in at least one KPI in a customer array.

12. The method of claim 9, wherein if the impact metric is greater than or equal to the metric threshold, further comprising the steps of:
   determining whether an impact count is greater than or equal to a data count trigger wherein the impact count prioritizes adding a data type to a selection of parameters to be considered in DLPA;
   if the impact count is greater than or equal to the data count trigger, then selecting a data type depending on a highest value impact metric and selecting a new parameter within the data type to add to the data array;
   if the impact count is less than the data count trigger, then determining whether the impact count is less than a data count minimum, wherein the data count minimum represents a minimum impact count needed to keep the data type as a parameter to be considered in DLPA.

13. The method of claim 9, wherein if the impact count is less than a data count minimum, then selecting an impact data type with a smallest value and removing the selected parameter from the data array.

14. The method of claim 9, wherein the support data comprises type of support inquiry, resolution, response time, resolution time, frequency of support contact, customer satisfaction data.

15. The method of claim 9, wherein the DLPA metrics comprise one or more of: recommendation acceptance rate; recommendation impact; acceptance impact, financial account acceptance rate; financial recommendation impact, an array of past recommendations to the customer; support impact and communications impact.

16. The method of claim 9, wherein KPI represents total funds transferred; total number of transfers, total balances, total number of recipients, and total number of financial accounts.

17. A computer-readable medium comprising instructions which, when executed by a computer, cause the computer to carry out steps of:
   receiving one or more customer parameters and remittance trends, wherein the one or more customer parameters comprise social media data, support data, communications data, and geolocation data;
   accessing, via a customer account database, one or more key performance indicators (KPIs);
   accessing one or more DLPA metrics; wherein the DLPA metrics are impacted by one or more responses to a customer remittance suggestion;
   responsive to the KPI and DLPA metrics, adjusting a size of a data array for a predetermined time window for an individual customer; the step of adjusting comprising:
      comparing an initial test period with a count trigger;
      calculating a new set of values for KPIs and one or more impact metrics for the initial test period;
      determining whether an impact metric is greater than or equal to a metric threshold;
         if the impact metric is greater than or equal to the metric threshold, then increasing a priority of recommendation acceptance rate (RAR) or recommendation impact (RI) and increasing the size of the data array;
         if the impact metric is less than the metric threshold, then decreasing a metric count and decreasing a priority of recommendation acceptance rate (RAR) or recommendation impact (RI) and decreasing the size of the data array;
   dynamically processing a plurality of transaction data based on the one or more adjusted at least one array to achieve memory conservation and optimal computation;
   based on the adjusting step, generating a set of remittance suggestions and financial suggestions; and
   communicating the set of remittance suggestions and financial suggestions.

18. The computer-readable medium of claim 17, wherein the one or more impact metrics comprise support impact (SI) metrics that represent a fraction of support outcomes resulting in an increase in at least one KPI in a customer array; social media impact (SMI) metrics that represent a fraction of social media outcomes resulting in an increase in at least one KPI in a customer array and communications impact that represents a fraction of communication outcomes resulting in an increase in at least one KPI in a customer array.

19. The computer-readable medium of claim 17, wherein if the impact metric is greater than or equal to the metric threshold, the computer processor is further configured to perform the steps of:
   determining whether an impact count is greater than or equal to a data count trigger wherein the impact count prioritizes adding a data type to a selection of parameters to be considered in DLPA;
   if the impact count is greater than or equal to the data count trigger, then selecting a data type depending on a highest value impact metric and selecting a new parameter within the data type to add to the data array;
   if the impact count is less than the data count trigger, then determining whether the impact count is less than a data count minimum, wherein the data count minimum represents a minimum impact count needed to keep the data type as a parameter to be considered in DLPA.

20. The computer-readable medium of claim 17, wherein the support data comprises type of support inquiry, resolution, response time, resolution time, frequency of support contact, customer satisfaction data.

* * * * *